Feb. 13, 1923.
S. L. MATHEWS.
ELECTRIC LOCK AND ALARM FOR AUTOMOBILES.
FILED OCT. 11, 1919.
1,445,529.
2 SHEETS—SHEET 2.
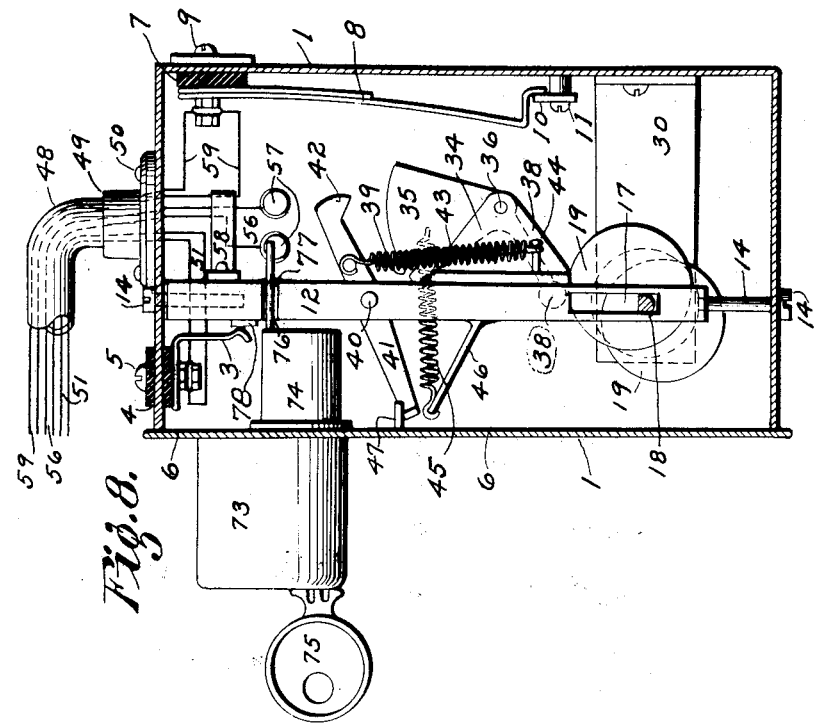
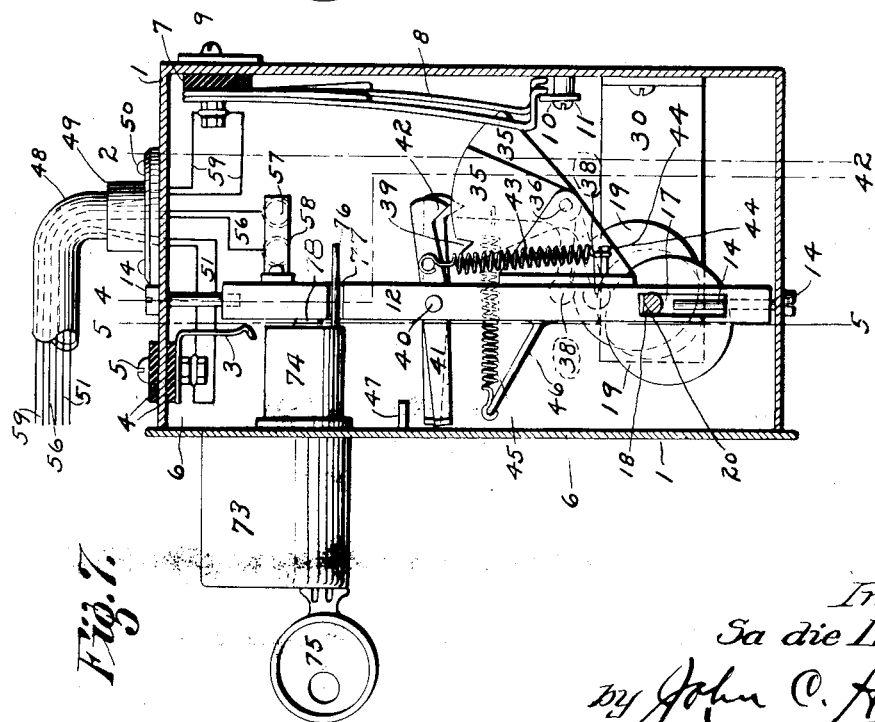
Inventor
Sadie L. Mathews.
by John C. Higdon
Atty.

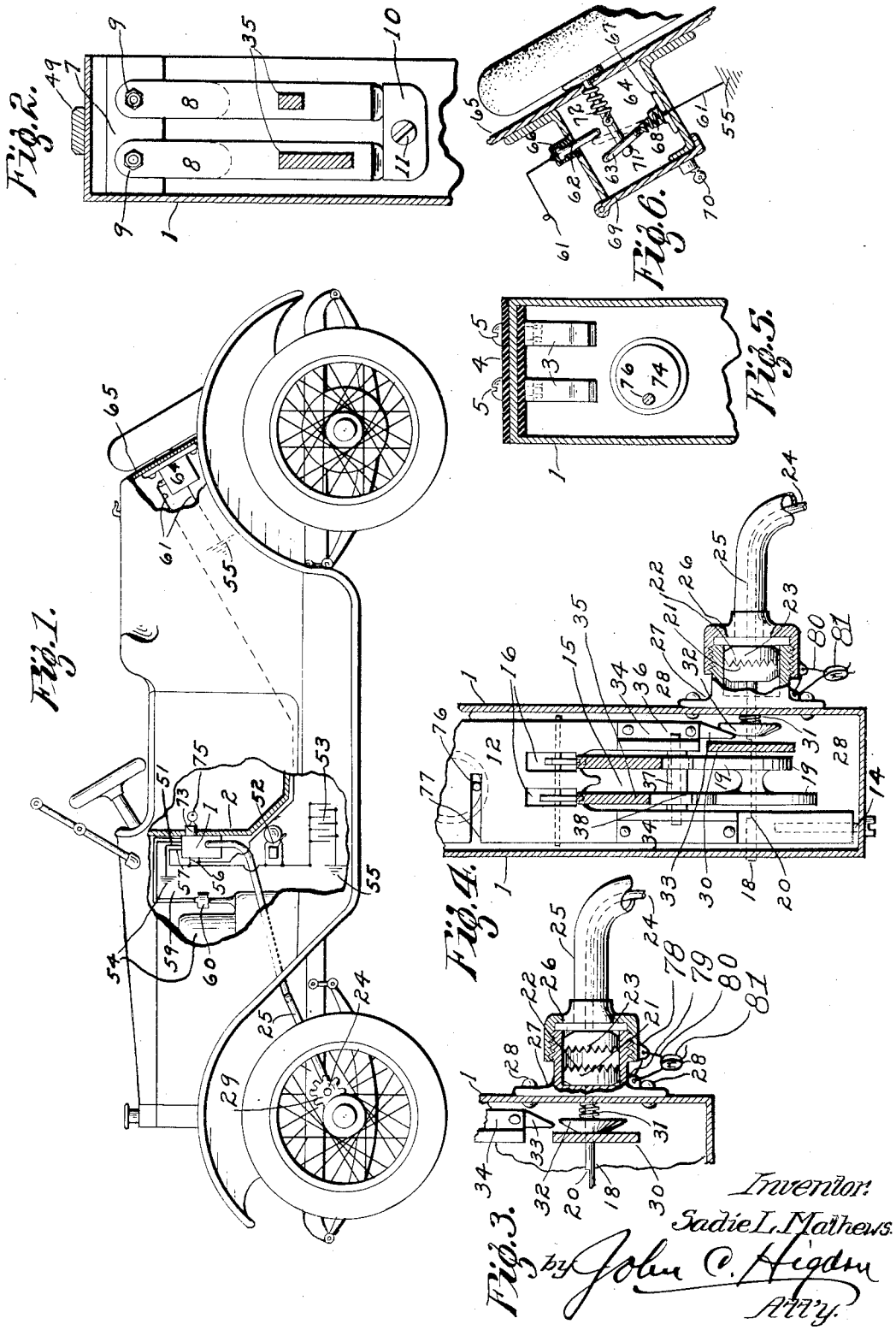

Patented Feb. 13, 1923.

1,445,529

UNITED STATES PATENT OFFICE.

SADIE L. MATHEWS, OF ST. LOUIS, MISSOURI.

ELECTRIC LOCK AND ALARM FOR AUTOMOBILES.

Application filed October 11, 1919. Serial No. 330,011.

*To all whom it may concern:*

Be it known that I, SADIE L. MATHEWS, a citizen of the United States, residing at St. Louis, in the State of Missouri, have invented certain new and useful Improvements in Electric Locks and Alarms for Automobiles, of which the following is a specification containing a full, clear, and exact description, reference being had to the accompanying drawings, forming a part hereof.

The present invention consists in the novel construction and arrangement of parts hereinafter particularly described and claimed.

The principal object of my invention is to provide an improved combination of a mechanically-controlled automatic clutch, and electrical locking and circuit-making and breaking mechanism, both of which shall be controlled by a single movement of the owner's lock-key, in connection with an electric alarm mechanism, or otherwise, to render impossible the theft of an automobile or any of the extra tires (which are usually carried by such vehicles) without the sounding or exhibition of an alarm, which will occur whenever such theft is attempted; and which combination shall be efficient in operation, as well as of low cost, and capable of ready application to all makes of automobiles and motor trucks.

The present application is an improvement on the electric lock and alarm for automobiles shown and described in my application for patent, Serial No. 279,402, filed February 26, 1919, and containing claims generic to the invention disclosed in the present applicaion.

A further object of my present invention is to improve upon the invention that forms the subject-matter of my said prior application, whereby the lock-mechanism will be operated and controlled by an ordinary Yale lock and key in the following described manner:—Turning said key in one direction so as to be able to extract the key from the lock that is concealed, connects the electric-alarm circuit, breaks the engine-starter circuit, and at the same time throws in mesh with the running-gear of the automobile an automatic clutch, while the automobile is at a stand-still; thus protecting the automobile against theft. Turning said key in an opposite direction, back to the point it previously occupied (and normally occupies), throws off the alarm, disconnects the automatic clutch through which movement of the automobile by an unauthorized person would have been communicated to the lock-slide to sound an alarm, connects the engine-starter circuit, and places the machine in normal running condition.

A further object of my invention is to provide an improved means for saving the electric current upon the automobile, whereby when the private key of the owner is inserted in the lock and turned partially around therein the lock-mechanism will be cut out, and no current will be used thereby during the legitimate operation of the automobile.

In the drawings,

Fig. 1 is a sectional side-elevation of an ordinary automobile, having my invention applied thereto, with the electric circuits diagrammatically shown therein.

Fig. 2 is a detail vertical section of the upper portion of the lock housing, taken on the line 2—2 of Fig. 7.

Fig. 3 is a detail vertical section of the lower side-portion of the lock-housing, showing the automatic clutch of the lock-mechanism in a position which disconnects the lock-mechanism from the front wheel of the automobile when the owner is using the machine.

Fig. 4 is another detail vertical section of the lower portion of the lock, taken on the line 4—4 of Fig. 7.

Fig. 5 is a detail vertical section of the upper end of the lock, taken on the line 5—5 of Fig. 7.

Fig. 6 is a detail diagrammatic view of my spare-tire theft-alarm mechanism.

Fig. 7 is a substantially full-sized side-elevation of the main lock-mechanism, with its parts adjusted to a "safety" or locked position, and Fig. 8 is a view similar to the last, with the parts in a "running" position, in which they are placed by turning the key in the lock, while the car is in the hands of an authorized person.

*General description.*

The numeral 1 designates the casing or housing of the main lock-mechanism, which is to be attached to the inner vertical wall of the dash or cowl 2 of the automobile by means of common screws or bolts (not shown), so that said casing and the lock-mechanism it contains will be concealed and protected in such position, not only from thieves and burglars, but from the weather.

Said casing 1 is to be made of strong steel, so as to thoroughly protect the lock-mechanism from tampering, and while it is shown in a rectangular form, it may of course be circular or oblong in shape.

Two short vertical contact-springs 3 are attached to the interior of the top wall of said casing 1, and are insulated therefrom, by means of insulation 4, held in place by common binding posts or screws 5, so that the lower ends of said contact-springs will project free, but separated a distance. (See Fig. 5).

One side wall of the casing 1 (preferably the side that is next adjacent the driver's seat) is to be made movable or detachable, to act as a cover or door, for affording access to the mechanism upon the interior of said casing, by any person having authority, and said cover is designated by the numeral 6.

The numeral 7 designates common insulation at the upper ends of two vertical flat leaf-springs 8 that are mounted within said casing parallel with each other, and held in position by the screws or binding-posts 9, so that the lower ends will normally be insulated from each other and rest in contact with a body of insulation 10, which forms a back-stop for them, and is fixed to the vertical wall of the housing or casing 1 by means of a cap-screw 11.

By this construction, the lower ends of said springs 8 are held (by the inherent power of the springs) normally out of contact with the adjacent vertical metallic wall of the casing 1, so that no current can pass through said springs to or from said wall.

A movable device, which I denominate a lock-slide 12, is mounted in said casing 1 to move vertically therein upon vertical guide-pins 14 that are fixed to the upper and lower walls of the casing and extend into holes drilled into the upper and lower portions of the said lock-slide, whereby the latter will be allowed to move freely up and down, and yet be guided in such movements.

The lower portion of the said lock-slide 12 is bifurcated by a wide slot 15 terminating at its upper end in two narrow slots or recesses 16, but one of the legs formed by said wide slot is made longer than the other leg, and it is this longer leg which is engaged by the guide-pin 14 at the lower end of the casing. (See Fig. 4).

Formed in the longer leg of the said lock-slide 12, near the lower end of said leg, is a vertical slot 17 through which extends a short horizontal shaft 18, which I term the combined clutch and cam shaft.

Said shaft 18 is mounted in suitable bearings in the opposite side-walls of the casing 1, and is adapted to slide loosely, and also to turn, in said bearings.

A portion of the said shaft or spindle 18 is made non-circular in cross-section, and two oppositely-set eccentric-disks 19 are spaced apart a distance, as shown, and are splined or otherwise mounted on said shaft, so that said shaft may slide in the axial bearings which said eccentric-disks have upon said shaft, and yet compel the disks to rotate with the shaft.

In the present case, the shaft 18 is provided with a flattened portion 20, and the bearings of said eccentric-disks on said shaft are correspondingly non-circular, for the purpose stated.

Fixed on one end of said shaft 18, exterior of said casing 1, is a circular clutch-jaw 21 provided with teeth 22 which engage the teeth of an opposite clutch-jaw 23 fixed on the adjacent end of a flexible-shaft 24.

A common flexible-shaft casing 25 has one of its ends connected or attached to the exterior side-wall of said casing 1 at a point near the lower end thereof by means of the common flanged and internally-threaded coupling 26, and an externally-threaded socket 27 having a flange fixed to the casing by means of rivets 28 or other means that cannot be readily destroyed or removed without the use of burglar-tools.

Said flexible-shaft casing 25 extends from the lock-casing 1 to a point adjacent the front wheel of the automobile, or some other part of the vehicle that necessarily moves whenever the automobile is driven, towed, pushed or otherwise moved along the road or street, and a toothed-pinion 29 is thereat fixed on the adjacent end of said flexible-shaft 24, and mounted (by common means now used in speedometer-pinion mounting) to mesh with a gear-wheel (not shown) mounted on or carried by the front wheel of the automobile or some other movable part of the vehicle.

By this construction, when the clutch-jaws 21 and 23 are closed, the said shaft 18 in said casing 1 will be driven whenever the automobile is moved.

In the present construction, the said jaws 21 and 23 of the said clutch mechanism are located within, and protected by, the said socket 27.

A bracket 30 has one end flanged and secured to the interior of said casing, at a point just beneath the said leaf-springs 8, and said bracket extends horizontally through said wide slot 15 of the said lock-slide 12, to a point near the opposite wall of said casing.

The said shaft 18 has a bearing in said bracket 30, but the main purpose of the bracket is to form a stop to limit in one direction the movement of said eccentric-disks 19 upon said shaft.

The normal position of the clutch jaws 21 and 23 is that shown in Fig. 3, with the movable-jaw 21 separated from the opposite jaw 23; and this normal position is maintained as long as the car is in the possession of its owner, by a spring 31 coiled around said shaft 18 and bearing at its outer end against the adjacent inner wall of said casing, and with the inner end of said spring in contact with a circular cam-disk 32 that is fixed on said shaft. (See Fig. 3).

Whenever the said lock-slide 12 is moved downwardly, to a locking position by the owner of the car when he leaves it in a locked position, as will be explained further on, a wedge 33 at the lower end of the shorter leg of said lock-slide 12 is brought in contact with the conical face of the said cam-disk 32, and slides the said shaft 18 carrying said disk to the position in which it is shown in Fig. 4, compressing said spring 31 and causing the teeth of the sliding clutch-jaw 21 to mesh with the teeth of the opposite clutch-jaw 23, so that if the car is stolen, or moved forward or back by an unauthorized person, the said flexible-shaft 24 will communicate such movement to said shaft 18, and the said eccentric-disks 19 will be correspondingly rotated, with the effect that will be hereinafter described.

Two brackets 34 are fixed to the said legs of the said lock-slide 12, and extend parallel at a point slightly above the said eccentric-disks 19.

Two segmental tumblers 35 are mounted between said brackets 34, upon a horizontal pin 36 extending from one of said brackets to the other one.

A sleeve or enlargement 37 on said pin 36 spaces said tumblers apart, and said tumblers have at their lower ends arms 38 which extend downwardly at an angle and their free lower ends are normally held in contact with the periphery of said eccentric-disks 19 by the springs hereinafter mentitoned.

In the upper edge or periphery of said tumblers is a locking-recess 39.

Mounted in the small vertical slots 16 of the said lock-slide 12, upon a horizontal pin 40, are two releasing-dogs 41 which are provided with downwardly-projecting pointed portions 42 adapted to enter said locking-recess 39 of said tumblers, and hold the latter in an alarm-producing position under the circumstances hereinafter mentitoned.

Common coiled springs 43 have their upper ends attached to the said trip-levers or releasing-dogs 41, while the lower ends of said springs are attached to a pin 44 or some convenient projection on said lock-slide 12, whereby the said pointed portions 42 of said dogs will be at all times urged into contact with said tumblers 35, and will pass into said locking-recesses 39 when said tumblers are thrown outwardly or forwardly to an "alarm" position.

Common coiled springs 45 are used for returning the said tumblers 35 to their normal positions, (which is that in which they are shown in Fig. 8) the front ends of said springs being attached to the said tumblers as shown, while their rear ends are attached to a rearwardly-projecting arm 46 carried by said lock-slide 12, whereby the said springs and their connections will all move up and down with the said lock-slide when the latter is adjusted to a locked and to a running position.

A stop 47 is fixed in or upon the interior of the said casing 1 above the rear ends of said dogs 41, and projects in the path of the same, to limit the upward movement of said ends, as the said lock-slide 12 moves upwardly, and thereby cause the said dogs to be released to the position with which they are shown in Fig. 8.

To prevent and expose any tampering with the various parts of the lock, I provide a Government seal or a private seal therefor; as for instance (as shown in Figs. 3 and 4) the coupling 26 of said flexible-shaft casing 25 is provided with a perforated ear 78ª through which is passed a common seal-wire or strip 80 extending through the perforation of another ear 79 on the said clutch-socket 27, after which the ends of said seal-wire are connected by a common seal-disk or plate 81, applied by the usual hand-press, or attached in any desired manner to accomplish the sealing effect.

*The wiring arrangement.*

The arrangement of the electric conductors of the device may be varied by skilled workers without departing from the spirit or scope of my invention, but in the present case I provide a single metal-encased flexible cable 48 for carrying all of the wires leading to the casing 1.

The said cable 48 is provided with the usual flanged coupling 49 at its casing end, whereby said cable will be connected securely to said casing.

The most convenient location upon the said casing 1 for the said coupling 49 is, as shown in Figs. 7 and 8, upon the top of the casing, where the flange of said coupling is firmly secured in place by means of rivets 50 or other approved fastening means.

A pair of electrical-conductors 51, within said casing 1, connect said binding-posts 5 of said short vertical contact-springs 3 to the usual electric-starter, coil-box, magneto, (not shown), and a battery 53, all located of course upon the exterior of said casing in the desired positions.

Said conductors 51 are grounded at appropriate places, such as to the casing itself, to the frame or engine at 54, and to some part of the metallic automobile construction at 55, as may be required. The conductors 51 and the said instrumentalities which are included in this circuit constitute an ignition or starting circuit which is closed by the shiftable slide or lug controlled member when the latter is raised to the position shown in Figure 7 to place the automobile in running condition.

Additional ordinary flexible conductors or wires 56 which extend to an auxiliary circuit-closing device have one of their ends connected to separated and insulated metallic contacts 57 fixed upon the side wall of said casing 1 near the upper end of the latter.

These contacts I term the alarm controlling contacts, as they are not normally connected, but (as shown in Fig. 8) a horizontal contact-arm 58 has one of its ends attached to the said lock-slide 12 so that said arm is adapted to be brought simultaneously into contact with both of said alarm-controlling contacts 57 whenever the said lock-slide is thrown or depressed, to the position in which it is shown in Fig. 7, and thereby complete the circuit across the said contacts.

The conductors 56 which are connected with the auxiliary circuit-closing device are arranged in circuit with an alarm device such as as an electric horn or bell 52 or common electric lamps and additional conductors or wires 59 which are arranged in the alarm circuit have their ends extended into the casing and connected to the binding posts 9 of the said flat leaf springs 8. The conductors 56 and 59 pass upward and outward the said casing by way of the said flexible cable 48 but they may be arranged in any desired manner to include the alarm and the battery so that when the shiftable lock-controlled slide or member is moved downwardly to open the ignition or starting circuit for preventing the automobile from being operated under its own power, the alarm circuit will be closed and the alarm sounded when the springs 8 are successively moved to and locked in their closed position by a movement of the automobile.

*The spare tire alarm.*

Circuit wires 61 lead from the said wires of the alarm-circuit back to the rear (or to any usual part of the vehicle where spare tires are stored) and are connected to two electrical contacts 62 and 63 respectively which are sealed and locked within a spare-tire contact-box 64 that is concealed within the rear portion 65 of the automobile body.

Said contact 62 is fixed upon, but insulated from, the walls of said contact-box 64 by means of insulation 66, and the construction is such that the inner end of said contact projects normally free upon the interior of said box. (See Fig. 6.)

Said contact 63 is pivotally-mounted in said box 64 upon a bracket 67, and is normally held out of contact with the fixed contact 62 by a contractile spring 68, which yieldingly retains said movable contact 63 in either position it may be placed.

Said contact-box 64 is fitted with a hinged cover or lid 69 secured by a common lock provided with a detachable-key 70.

The spare tire or other spare parts to be protected, is secured to the usual tire-holder (not shown) to which is fixed a contact-making hook 71, that projects into said box and embraces the said movable contact 63, in such a manner that whenever a pull is exerted upon said tire or other part, the said hook 71 will be drawn outwardly to the position in which it is shown in dotted lines.

This action will, of course, close the circuit on the alarm horn, bell, or lights, by way of said conductors 61 and 51, and if any such spare part is stolen or removed from the machine, an alarm will be sounded or exhibited.

Said contact-making hook 71 is yieldingly held at the limit of its inward movement by a common spring 72, one end of which bears against the wall of said box 64 and the opposite end of which is secured to the said hook, to force the latter inwardly.

The spare part alarm will be sounded as long as the said movable contact 63 is allowed to rest in contact with the said fixed contact 62, and it can only be removed from such alarm-sounding position by opening the said box, no matter if the thief endeavors to stop the alarm by forcing said hook inwardly.

Such action cannot stop the alarm produced by a thief, because said hook cannot move said contact 63 inwardly, the hook engaging only the front of said contact, and said spring 68 retaining said contact in an alarm-producing position.

*The key and lock for the lock-slide.*

The said lock-slide 12, as well as other parts contained in said casing 1, are controlled by a common Yale lock (or any other common lock) 73 having the usual barrel 74, and detachable key 75.

A pin or arm 76 is mounted eccentrically upon the inner end of said lock-barrel 74, so it will be rotated or rocked a limited distance whenever said barrel is turned by the said key.

The said pin 76 engages the walls of a horizontal transverse slot 77 formed in said lock-slide at a point above the said narrow vertical slots 16, and moves the said lock-slide up or down, as required.

*The operation.*

Turning the key 75 in one directon, so as to be able to extract the key as usual, forces the lock-slide downwardly to the position in which it is shown in Fig. 7, and thereupon the mechanism is placed in a "locked" or safety adjustment, in which the bar 58 closes the circuit between the two contacts 57, and connects the alarm circuit, while at the same time throws in mesh the teeth of the clutch-jaws 21 and 23, thereby connecting said shaft 18 to the running-gear of the automobile through the said flexible-shaft 24, while the automobile is at a stand-still.

Such downward movement of said lock-slide also carries the said contact-bar 78 on said slide out of contact with the lower ends of the said vertical contact-springs 3, and thereby the engine-starter and timer circuit-wires are cut out, disabling the engine, and preventing its operation.

Should a thief or other unauthorized person move the automobile, either forward or backward, the said pinion 29 will rotate the said flexible-shaft 24, and the eccentric-disks 19 carried by said shaft 18 within said casing 1, thereby causing the peripheries of said disks to engage the said arms 38 of the said segmental tumblers 35, and the latter will be projected to the position in which one of them is shown in Fig. 7, into contact with the lower portions of the said flat leaf-springs 8, and will press both of the latter into contact with the metallic wall of said casing 1 and complete the circuit through the said conductors 59 of the alarm circuit, and an alarm will be sounded by the alarm device, such as bell 52.

Turning said key 75 in an opposite direction, will elevate said lock-slide 12 to the position in which it is shown in Fig. 8, and throw off the alarm, as well as disconnect the automatic clutch, and place all of the parts in normal running condition.

I claim:

1. A safety device for automobiles, including an alarm mechanism having a movable member and a rotary member, means for operating said rotary member from a rotary element of an automobile, including a clutch having relatively movable members, a lock, means controlled by the lock for carrying the movable member of the alarm mechanism into position to be operated by the rotary member when the vehicle is moved, and means actuated with said movable member in its movement into operative position for moving the movable member of the clutch into engagement with its cooperating member.

2. A safety device for automobiles, including an alarm mechanism having a rotary member and a shiftable member provided with a switch element, means for operating said rotary member from a rotary element of an automobile, including a clutch having relative removable members, a lock, means controlled by the lock for carrying the shiftable member into position for the operation of the switch element by the rotary member, and means actuated by the shiftable member in its movement into and out of operative position for moving the movable member of the clutch into engagement with its cooperating member.

3. A safety device for automobiles, including an alarm mechanism having a movable member and a rotary member, means for operating said rotary member from a rotary element of an automobile, including a clutch having relatively movable members, a rotary disk connected with one of the members of the clutch, a lock, means controlled by the lock for carrying the movable member of the alarm mechanism into position to be operated by the rotary member when the vehicle is moved, and a lug actuated with said movable member in its movement into operative position for engaging the rotary disk for moving the same in one direction, and means for automatically moving the disk in the opposite direction.

4. A safety device for automobiles, including a casing an alarm mechanism having a shiftable member and a rotary member located in the casing, means for operating said rotary member from a rotary element of an automobile, including a clutch having relatively movable members, a lock arranged within the casing, means controlled by the lock for carrying the shiftable member of the alarm mechanism into and out of position to be operated by the rotary member when the vehicle is moved, means actuated by the shiftable member in its movement into operative position for moving the movable member of the clutch into engagement with its cooperating member, said clutch being located exteriorly of the said casing, and an auxiliary housing mounted on the casing and receiving the clutch and provided with a closure having sealing means.

5. A safety device for automobiles including a rotary element carried by an automobile an ignition circuit, a shiftable member for opening and closing the ignition circuit, an alarm circuit, means for closing the alarm circuit when the automobile is moved while the ignition circuit is open, said alarm circuit-closing means including a shaft, a rotary clutch having interlocking members having relative movement to engage and disengage the same, one of the clutch members being connected with the said rotary element a rotary disk connected with one of the members of the clutch for actuating the same and a lug carried by the shiftable member and arranged to engage the rotary disk, said lug and rotary disk having coacting inclined faces.

6. A safety device for automobiles including a rotary element carried by an automobile an ignition circuit, a shiftable member for opening and closing the ignition circuit, an alarm circuit, means for closing the alarm circuit when the automobile is moved when the circuit is open, said alarm circuit-closing means including a shaft, a rotary clutch having relatively movable interlocking members, one of the clutch members being connected with said rotary element a rotary member carried by the shaft and connected with one of the members of the clutch, a spring for urging the rotary member in one direction and means carried by the shiftable member for urging the rotary member in the opposite direction and for holding the same against the action of the spring.

7. A safety device for automobiles including an ignition circuit, a casing, a shiftable member arranged within the casing for opening and closing the said circuit, guides located at opposite ends of the shiftable member and slidably receiving the same, an alarm circuit, means controlled by the shiftable member for closing the alarm circuit when the automobile is moved, said means including a shaft, rotary means for connecting the shaft with an automobile for producing a rotation of the shaft when the automobile is moved, a clutch for connecting and disconnecting the shaft from the said rotary means and means for operating the clutch.

8. A safety device for automobiles including an ignition circuit, a casing, a shiftable member arranged within the casing for opening and closing the said circuit, guides located at opposite ends of the shiftable member and slidably receiving the same, an alarm circuit, means controlled by the shiftable member for closing the alarm circuit when the automobile is moved, said means including a shaft, rotary means for connecting the shaft with an automobile for producing a rotation of the shaft when the automobile is moved, a clutch for connecting and disconnecting the shaft from the said rotary means and means controlled by the shiftable member for operating the clutch.

In testimony whereof I have signed my name to this specification in presence of two subscribing witnesses.

SADIE L. MATHEWS.

Witnesses:
   FRANCES E. MORRIS,
   JOHN C. HIGDON.